FIG. 1

Jan. 10, 1956 M. A. GOODBAR ET AL 2,730,038
LABEL PRINTING AND ISSUING MECHANISM FOR CASH REGISTERS
Filed March 22, 1952 5 Sheets-Sheet 4

INVENTORS
MAYO A. GOODBAR &
RUSSELL G. PRATT
BY Carl Beust
Richard Van Buren
THEIR ATTORNEYS Jan. 10, 1956   M. A. GOODBAR ET AL   2,730,038
LABEL PRINTING AND ISSUING MECHANISM FOR CASH REGISTERS
Filed March 22, 1952   5 Sheets-Sheet 5

INVENTORS
MAYO A. GOODBAR &
RUSSELL G. PRATT
BY Carl Beust
Richard Van Buren
THEIR ATTORNEYS

United States Patent Office 2,730,038
Patented Jan. 10, 1956

2,730,038

LABEL PRINTING AND ISSUING MECHANISM FOR CASH REGISTERS

Mayo A. Goodbar, Oakwood, and Russell G. Pratt, Dayton, Ohio, assignors to The National Cash Register Company, Dayton, Ohio, a corporation of Maryland Application March 22, 1952, Serial No. 278,063

7 Claims. (Cl. 101—69)

The present invention relates to cash registers and analogous machines and is particularly directed to improvements in the receipt or label printing and issuing mechanism of such machines.

The general object of the present invention is the provision of an efficient and compact machine of small dimensions for printing and issuing labels for use in identifying the contents and the price of prepackaged commodities.

Another object of the present invention is to provide a machine for printing and issuing labels for use in the identification of the contents, grade, weight, price per pound, and total price of prepackaged commodities, such as meats, cheeses, and other similar commodities.

A further object is the provision of a plurality of readily-removable printing elements for printing the names of the contents of the packages on the labels, said elements being capable of storing a supply of printing fluid or ink sufficient for the printing of many impressions.

Still another object of the present invention is to provide mechanism controlled by the printing elements for preventing operation of the machine unless said elements are properly installed or inserted therein.

Still another object is the provision of a manually-settable device for printing the price per unit of weight or quantity of the contents of the package on the labels as they are issued.

A still further object of the present invention is the provision of mechanism controlled by the manually settable printing device for preventing operation of the machine, after one printing element has been changed for another printing element, until the price per unit has also been changed to agree with the presently-installed printing element.

With these and incidental objects in view, the invention includes certain novel features of construction and combinations of parts, a preferred form or embodiment of which is hereinafter described with reference to the drawings which accompany and form a part of this specification.

GENERAL DESCRIPTION

Figure 1:
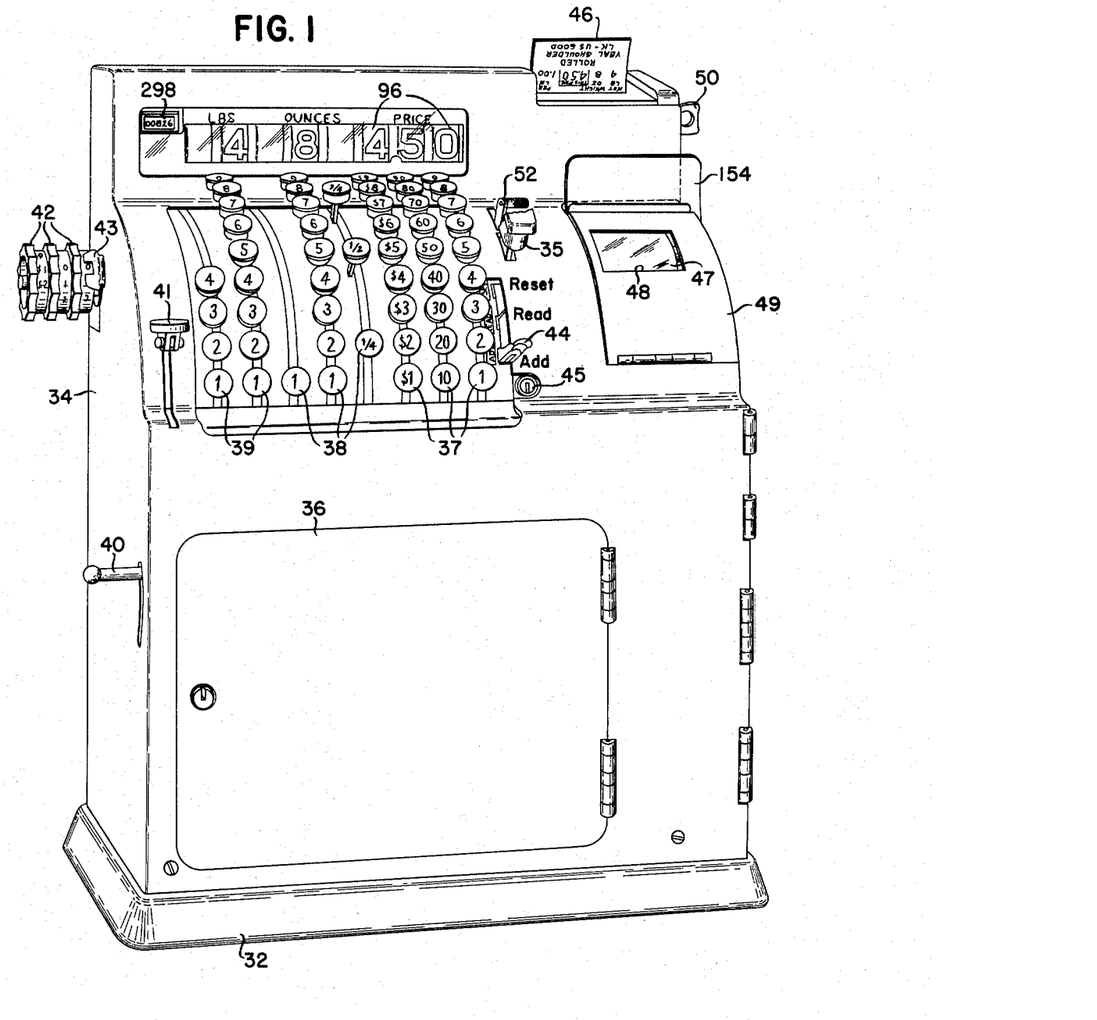
Fig. 1 is a perspective view of the complete label printing and issuing machine.

Referring to Fig. 1, it will be seen that the present invention is embodied in a well-known type of accounting machine or cash register, which is efficient, compact, light-weight, and of small dimensions. Such a machine is ideal for use where space is limited or where it is desirable to transport said machine from one position of use to another, which is often required in certain business systems. While the machine is comparatively light and small in overall dimensions, still it is complete in every way and has many of the features found in larger and more costly machines.

The present invention is concerned with printing mechanisms in general and is more particularly directed to an efficient mechanism for printing and issuing gummed labels which are to be attached to or placed within prepackaged commodities such as packages of meats, cheeses, etc., said labels being used principally for identifying the contents, weight, price per pound, and total price of such packages. In the present disclosure, the machine is arranged to print and issue labels for use in connection with packaged meats. However, this is but one use for such labels and is intended only as an example, as, with minor adjustments and alterations, the machine may be arranged to prepare labels for use in connection with many other merchandising systems involving the sale of prepackaged merchandise.

The present disclosure will be principally confined or limited to the subject matter of the present invention. For a full disclosure of other mechanism of the machine, not pertinent to the present invention, reference may be had to United States Patent No. 1,816,263, issued July 28, 1931, and United States Patents No. 2,056,485 and No. 2,056,486, issued October 6, 1936, to William H. Robertson.

Framework

The machine chosen to illustrate the present invention comprises a left frame 30 (Figs. 2 and 14) and a right frame 31, secured in properly spaced relationship to each other by a base plate (not shown) and by various cross frames, rods, and bars, said base plate in turn being secured to a machine sub-base 32 (Fig. 1). The printing mechanism of the machine is supported principally by a main printer plate 33 secured in spaced relationship to the right frame 31 by cross studs extending therebetween. The mechanism of the machine is enclosed in a suitable case or cabinet 34 (Fig. 1), which is secured to the base plate by suitable screws.

Keyboard

The keyboard of the machine comprises a machine starting or release bar 35 (Figs. 1 and 3), depression of which closes the electrical circuit to a small electric motor (not shown) accessible through a door 36 in the cabinet 34, and simultaneously engages a clutch mechanism which connects said motor to the main cam shaft of the machine. After the main cam shaft has completed one revolution of movement, which is required for each machine operation, the clutch mechanism is automatically disengaged and the electrical circuit is simultaneously opened to terminate operation of the machine. If necessary or desirable, the machine may be manually operated by means of a hand crank (not shown), and in this case the machine is released for operation by depression of the starting bar 35, the same as when the machine is operated electrically.

In addition to the starting bar 35, the keyboard of the machine comprises three rows of price-setting or amount keys 37, three rows of ounce keys 38, and two rows of pound keys 39, the price keys 37 being used for setting up the price of each package of the packaged commodities, and the weight keys 38 and 39 being used for setting up the weight in pounds and ounces of each of said packages. The usual repeat key 41 (Fig. 1) is provided for repeating the previous adding operation and controls the differential mechanisms for the price keys 37 and the weight keys 38 and 39, to cause the weight and the price of the previous transaction or operation to be repeated in any desired number of succeeding operations without any foreknowledge on the part of the operator that the price and weight of such previous transaction are to be repeated.

The price keys 37 and the weight keys 38 and 39 are automatically released at the end of machine operation in the usual and well-known manner, and, in addition, a manual release lever 40 is provided for releasing any of said keys whenever required. The banks of keys 37, 38, and 39 are of so-called flexible construction, in that depression of a key in one row releases a previously-depressed key in the same row, so that, in case an error is made in setting up data, the error may be corrected without use of the manual release lever 40.

Three hand wheels or knobs 42 (Fig. 1) are provided for setting corresponding type wheels to print the price per pound of the contents of the packaged commodities upon the record material, as will be explained later. A guide plate 43, secured to the left outer face of the cabinet 34, has therein an alining notch, which is used to position the hand wheels 42 and the corresponding type wheels in relation to the printing line.

The keyboard of the machine also includes the usual total control lever 44 (Figs. 1 and 16), which conditions the single totalizer, with which the machine is equipped, for adding, reading, and resetting operations. A lock 45 may be used in conjunction with the total control lever 44 for locking said lever in set positions. The repeat key 41 is rendered inoperative in reading and resetting operations.

The price keys 37, the weight keys 38 and 39, and the hand knobs 42 control the positioning of corresponding type or printing wheels, in a manner to be described presently, for printing data corresponding thereto upon an issuing label 46 (Figs. 1 and 11), the back surface of which is gummed for conveniently attaching said label to the corresponding package. In addition to the issuing labels 46, the machine is provided with a detail audit strip 47, a portion of which is visible through the transparent covering of a window 48 in a door 49 of the cabinet 34. The door 49 gives access to the detail strip 47 for the purpose of removing a portion of said strip at the end of a certain business period, or for the purpose of renewing the supply of said detail strip when required.

When the total control lever 44 is in adding position, as shown in Fig. 1, the printing hammer for the detail strip 47 is disabled, and consequently no impression is made upon said strip in all such operations. Likewise, the step-by-step feeding mechanism for said detail audit strip is permanently disabled, so that the only manner in which said strip may be fed or advanced is by manual turning of the usual winding key (not shown) provided for the detail strip receiving roll.

In reading and resetting operations, moving the total control lever 44 out of adding position enables the hammer for the detail audit strip 47, so that the amount of the total will be recorded upon said strip or upon an insertable slip, as will be explained later. Likewise, moving the total control lever 44 out of adding position disables the feeding and printing mechanism for the label 46, and consequently no label is issued in total-taking operations. The total control lever 44 (Fig. 1) controls the positioning of a corresponding type wheel (not shown) for printing symbols, for identifying the type of operation being performed, upon the detail audit strip 47.

One of the novel features of the machine of the present invention is the provision of a series of insertable and removable stamps or commodity printing keys 50 (Figs. 1 and 7) for printing the names of the contents of the packaged commodities upon the label 46. In the present system, one of the keys 50 is provided for each different type of commodity packaged, and a convenient rack or magazine 51 (Fig. 10), made of suitable material, such as molded plastic, is provided for storing the different keys 50 in prearranged order, so that they may be readily identified and quickly selected for use in the machine.

Located just above the starting bar 35 (Fig. 1) on the keyboard of the machine is a manually-operable "on" and "off" control lever 52 for controlling the removal and the insertion of the stamp keys 50. When the lever 52 is in "on" position, the stamp key 50 is locked in the machine and may not be removed therefrom until said lever is moved to "off" position. When the lever 52 is in "off" position, the machine is locked against operation and may not be operated until said lever is moved to "on" position. Likewise, the locking mechanism controlled by the lever 52 functions automatically to prevent operation of the machine unless the key 50 is properly and fully inserted in the machine. The above locking mechanism also functions in conjunction with the hand knobs 42, and, after said locking mechanism has been rendered ineffective by movement of the control lever 52 to "off" position, to permit the removal and insertion of the stamp keys 50, it is impossible to operate the machine until the knobs 42 have been manipulated to set up the proper price per pound for the commodity represented by the key 50 last inserted in the machine. In other words, when one of the stamp keys 50 is exchanged for another, it is necessary to reset the knobs 42 to the price per pound corresponding to the name of the commodity on the stamp key presently inserted in the machine before said machine may be operated.

In addition to the mechanism outlined above for printing data upon the label 46, the usual cylinder (not shown), which feeds the label material in relation to the printing mechanism, is provided with an electro for printing data of a fixed or permanent nature upon any desired portion of the label 46. Likewise, the cylinder for feeding the label material is provided with the usual printing wheels, which are settable by knobs extending outwardly from said cylinder, to print the grade of the different types of food commodities upon the bottom edge of the label 46.

The present machine is provided with a sensing mechanism which coacts with the periphery of the supply roll of label material 46 (Fig. 18) to automatically lock the machine against operation when the supply of record material is nearly exhausted, to apprise the operator of this fact. The sensing mechanism may be manipulated after it has locked the machine against operation so that said machine may be operated thereafter if desirable.

In the ensuing pages, the mechanism which has been described in a general way above, and which is pertinent to a proper understanding of the present invention, will be described in detail. For a full description of other mechanism not pertinent to the present invention, reference may be had to the Robertson patents referred to near the beginning of this specification.

DETAILED DESCRIPTION

Price keys and associated differential mechanisms

Figure 2:
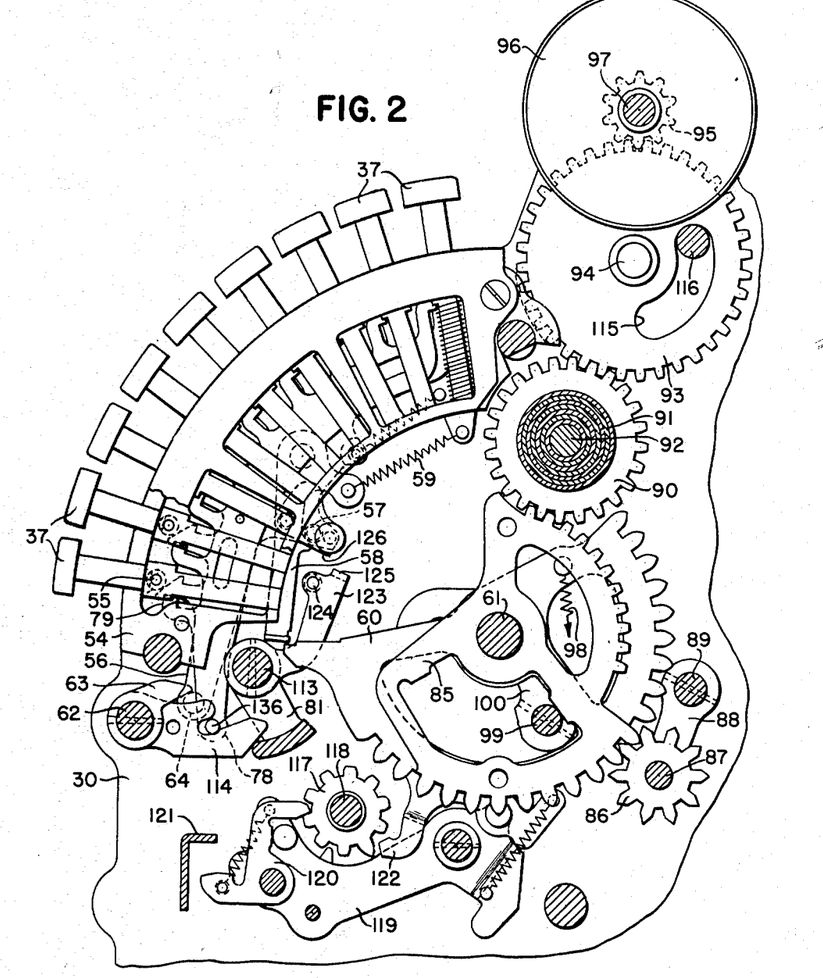
Fig. 2 is a cross-sectional view of the upper portion of the machine taken just to the right of one of the price-setting or amount banks.

The bank or row of price keys 37, shown in Fig. 2, will be used as representative of the rows of keys 37, 38, and 39, as the different banks of keys are all similar in construction, and therefore the description of one bank should suffice for all.

The keys 37 are depressibly mounted in a key frame 54, removably supported at each end by rods in turn supported by the main frames 30 and 31. Each key has a compressible spring for normally maintaining it in undepressed position. Depression of any one of the keys 37 (Figs. 1 and 2) causes a stud 55, secured in its stem, in cooperation with an angular camming surface on a corresponding projection of a flexible detent 56, shiftably supported in the key frame 54, to shift said detent downwardly against the action of a spring. Downward movement of the flexible detent 56 causes a stud 57 carried thereby, in cooperation with a camming projection on a zero stop lever 58 pivotally mounted on the key frame 54, to rock said zero stop lever 58 clockwise against the action of a spring 59. Clockwise movement of the zero stop lever 58 moves a bent-over ear on its downward end out of the path of an undercut surface on a forward extension of a corresponding primary differential member 60 rotatably suported on a shaft 61 journaled in the machine framework. Likewise, depression of any one of the keys 37 moves the lower end of its stem into the path of the forward extension of the primary member 60. When the key 37 is fully depressed, a shoulder, formed on the corresponding projection of the flexible detent 56, moves over a flat surface formed on the upper portion of the corresponding stud 55 to retain said key in depressed position. In case the wrong key 37 is depressed, depression of another key 37 in the same row causes the stud 55 therein, in cooperation with the angular camming surface on the corresponding projection of the flexible detent 56, to shift said detent downwardly or counter-clockwise to disengage the shoulder on said projection from the stud 55 of the depressed key to release said key for return movement upwardly under influence of its corresponding return spring. As before, full depression of the key 37 permits the detent 56 to return a slight distance upwardly under influence of its spring, to retain said key in depressed position.

In case it is desired to manually release a depressed key 37, downward movement of the key release lever 40 (Fig. 1) rocks a shaft 62, journaled in the machine framework (Fig. 2), clockwise. Clockwise movement of the shaft 62 causes a finger 63 secured thereon, in cooperation with a stud 64 secured in a downward extension of the flexible detent 56, to shift said detent downwardly against the action of its spring to disengage the shoulder on said detent from the stud 55 in the depressed key 37 to release said key to the action of its spring, which immediately returns said key upwardly to its undepressed position. Near the end of machine operation, the shaft 62 is rocked clockwise automatically, in the usual and well-known manner, to release all depressed keys 37, 38, and 39 (Fig. 1).

Machine-releasing and non-repeat mechanism

Figure 12:
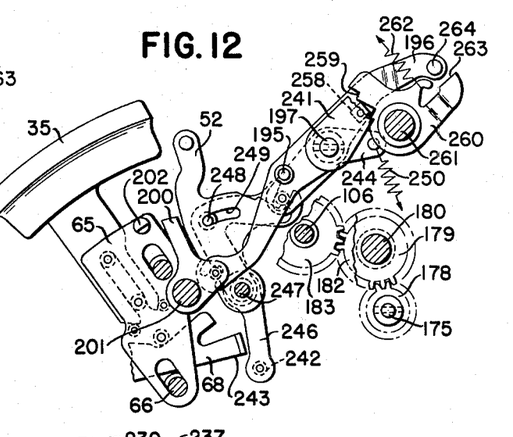
Fig. 12 is a right side elevation of a portion of the machine starting or releasing mechanism and certain of the control mechanism associated therewith.

The keys 37, 38, and 39 (Fig. 1) are used only in adding or label-issuing operations, and, after the proper ones of said keys are depressed, machine operation is initiated by depression of the starting bar 35. The starting bar 35 (Figs. 3 and 12) is removably connected to a starting bar slide 65, mounted for angular shifting movement by means of slots therein, in cooperation with studs 66 in the right frame 31. Depression of the starting bar 35 moves the slide 65 downwardly, causing a stud 67 therein, in cooperation with the upper surface of a lever 68 pivoted on a stud 69 secured in the right frame 31, to rock said lever clockwise against the action of a spring 70. Clockwise movement of the lever 68 moves a shoulder on its upper portion from beneath a bent-over ear 71 on a machine release pitman 72 mounted for vertical shifting movement by means of a slot in its upper end, in cooperation with the stud 69, and by means of a similar slot in its lower end (Fig. 18) in cooperation with a stud 80 secured in the right frame 31.

A right-angle extension on the lower end of the pitman 72 (Figs. 18 and 19) carries a stud 74, which engages a slot in the end of a crank 75 secured to a hub of a clutch control lever 76 free on a stud 77 supported by two ears bent outwardly from the right frame 31. A spring (not shown) urges the clutch control lever 76 (Fig. 19) counter-clockwise to shift the pitman 72 (Fig. 3) downwardly the instant the shoulder of the lever 68 is disengaged from the ear 71. Counter-clockwise movement of the clutch control lever 76 permits the clutch mechanism, which connects the operating motor to a main cam shaft 73 (Fig. 16) journaled in the frames 30 and 31, to become engaged and simultaneously operates a switch which closes the electrical circuit to said operating motor to cause the machine to operate.

The pitman 72 is operatively connected to a yoke 81 (Fig. 2) free on a shaft 113 journaled in the frames 30 and 31. Downward movement of the pitman 72, upon release of the machine for operation, rocks the yoke 81 clockwise (Fig. 2), causing the forward edge of its bail, in cooperation with an angular surface on the inner end of an arm 114 free on the shaft 62, to rock said arm counter-clockwise. The arm 114 has a slot which engages a stud 136 in the downward end of a locking slide 78 shiftably mounted in the frame 54 for the row of keys 37 being explained. Counter-clockwise movement of the arm 114, as explained above, shifts the locking slide 78 upwardly, causing the corresponding one of a series of hook-shaped locking projections 79 thereon to move above the stud 55 in the depressed key 37 to lock said key in depressed position, causing the other projections 79 to move underneath the studs 55 of the undepressed keys, to lock said keys in undepressed position, during machine operation.

A complete operation of the machine requires one counter-clockwise revolution of the main cam shaft 73 (Fig. 16), and, after said shaft has completed this counter-clockwise revolution, the clutch control lever 76 is restored clockwise (Fig. 19) in the well-known manner, as fully disclosed in the Robertson Patent No. 2,056,486. The clutch lever 76, upon being restored, disengages the clutch mechanism and opens the electrical circuit to the operating motor to terminate machine operation. Restoration of the clutch control lever 76 restores the release pitman 72 upwardly, and during such movement the ear 71 (Fig. 3) moves a slight distance above or beyond the stop shoulder on the lever 68, whereupon the spring 70 restores said lever counter-clockwise into the path of said ear to retain said pitman and the clutch control lever in restored positions.

A non-repeat pawl 82 (Fig. 3) is provided for preventing repeat operations of the machine in case the starting bar 35 is inadvertently retained in depressed position at the end of machine operation.

Figures 3, 4, 5, 6:
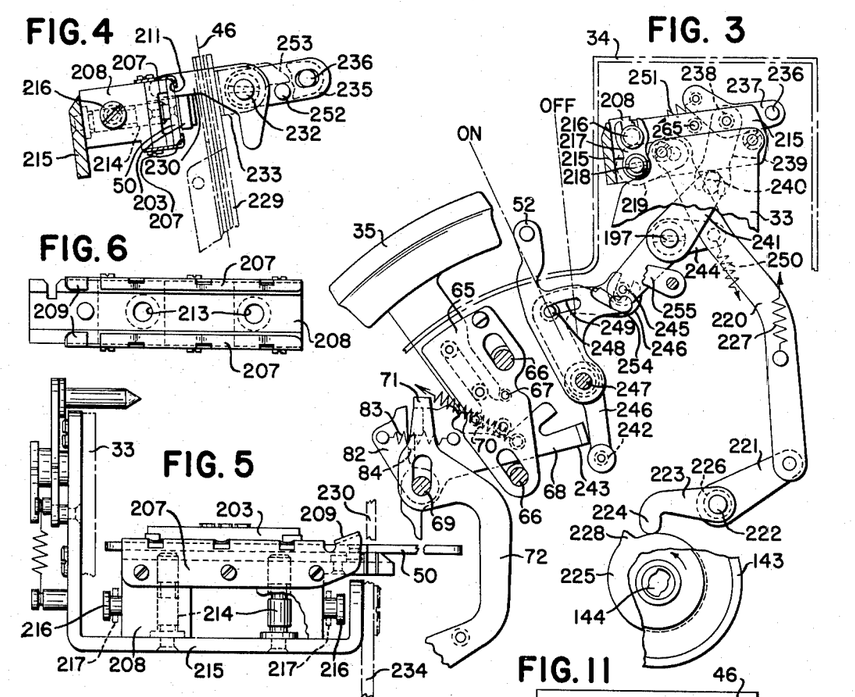
Fig. 3 is a right side elevation showing a portion of the machine-releasing mechanism and certain control mechanisms associated therewith, and also showing in general the mechanism for printing the names of the commodities upon the labels.
Fig. 4 is an enlarged detail view of a portion of the mechanism shown in Fig. 3, showing in particular the removable printing element and a portion of the control mechanism associated therewith.
Fig. 5 is a top plan view showing in particular the removable printing element and a part of the control and operating mechanisms associated therewith.
Fig. 6 is a detail view, as observed from the rear of the machine, showing the chute or receptacle for the removable printing elements.

The pawl 82 is free on the stud 69, and a spring 83, tensioned between said pawl and the lever 68, urges said pawl clockwise to normally maintain its inner surface in engagement with an ear 84 bent inwardly from the pitman 72. When the starting bar 35 is depressed, clockwise movement of the lever 68, through the spring 83, carries the pawl 82 clockwise in unison therewith until the upper end of said pawl, which is slightly longer than the shoulder on the lever 68, stops against the forward edge of the ear 71. It is therefore evident that, upon normal operation of the machine, the non-repeat pawl 82 does not in any way interfere with the downward releasing movement of the pitman 72.

Near the end of machine operation, the pitman 72 is over-restored upwardly far enough to move the lower edge of the ear 71 beyond the end of the non-repeat pawl 82, and, in case the starting bar 35 and the lever 68 are retained in depressed position at the end of machine operation, the spring 83 immediately moves said non-repeat pawl 82 into the path of said ear 71 to obstruct downward releasing movement of the pitman 72 and thereby prevent an unintentional repeat operation of the machine. The spring 70 is sufficiently strong to restore the lever 68 counter-clockwise and said starting bar upwardly to normal positions when pressure is removed from the starting bar 35. Counter-clockwise restoring movement of the lever 68 causes the ear 84 to engage the pawl 82 and rock said pawl counterclockwise in unison therewith from beneath the ear 71, at which time the shoulder on said lever 68, which is slightly shorter than said pawl 82, passes beneath said ear to retain the pitman 72 in its upward or restored position.

Upward restoring movement of the pitman 72 returns the yoke 81 (Fig. 2) counter-clockwise to normal position, to permit the locking slide 78 to be restored downwardly under influence of its spring, to unlock the keys 37 prior to operation of the automatic key releasing mechanism, which operates, as explained before, to release the depressed key 37.

Referring to Fig. 2, the primary differential member 60 for the bank of keys 37 being explained has a companion secondary differential member 85, free on the shaft 61. At certain times during machine operation, the primary and secondary members are clutched together for unitary movement by means of large teeth in their peripheries, which are engaged by the teeth of a clutching pinion 86 free on a rod 87 supported between companion arms 88 (only one shown) secured on a shaft 89. The shaft 89 is rocked back and forth to engage and disengage the clutching pinion 86 in the manner explained in the Robertson Patent No. 2,056,486.

The secondary member 85 has, on the upper portion of its periphery, gear teeth which mesh with teeth in a corresponding gear 90 secured to the corresponding one of a series of nested tubes 91 supported by a shaft 92 in turn supported by the framework of the machine. The gear 90 meshes with a corresponding gear 93 free on a rod 94 supported by the main frames 30 and 31. The gear 93 meshes with a pinion 95 connected to a corresponding indicator drum or roller 96 free on a rod 97 supported by the main framework of the machine, said indicator being visible through an opening in the cabinet 34 (Fig. 1). An aliner mechanism (not shown) coacts with the teeth of the pinion 95 to aline the indicator 96 in set position, as fully disclosed in the Robertson patents referred to herein. A spring 98 (Fig. 2) urges the primary differential members 60 clockwise to normally maintain a raised surface in an opening therein in yielding contact with a leading and restoring rod 99, supported by two arms 100 (only one shown here), secured on the shaft 61.

The shaft 61, the arms 100, and the rod 99 are oscillated first clockwise and back to normal position in the well-known and usual manner, as fully disclosed in the Robertson patents referred to hereinbefore. Prior to clockwise initial movement of the rod 99, the clutching pinion 86 is disengaged from the primary and secondary members, whereupon clockwise initialed movement of said rod 99 causes the primary member 60 to move in unison therewith, under influence of the spring 98, until the forward end of said primary member contacts the lower end of the stem of the depressed key 37, to position said primary member according to the value of said depressed key. The rod 99, during its clockwise initial movement, engages a raised pad in an opening in the secondary member 85 and restores said member and the corresponding indicator 96 clockwise and counter-clockwise, respectively, to normal or zero positions.

After the primary member 60 has been positioned, and after the secondary member has been restored to zero position, as explained above, the clutching pinion 86 is engaged with the teeth in said members to couple them together, whereupon the rod 99, upon its counter-clockwise return movement, engages the primary member 60 and restores said member counter-clockwise to normal or zero position, as shown in Fig. 2. Restoring movement of the primary member 60 carries the secondary member and, through the gearing explained above, the corresponding indicator 96 in unison therewith a distance corresponding to the value of the depressed key 37, to position said secondary member and said indicator accordingly.

The tube 91 for the denominational order of differential mechanism being explained (Figs. 2 and 15) has connected to its outer end a gear 101, which meshes with and drives a pinion 102 integral with a corresponding type wheel 103 free on a stud 104 fast in the printer back plate 33, for printing records on the detail strip 47. The gear 101 likewise meshes with an idler gear 105 free on a stud 106 secured in the plate 33. The idler gear 105 in turn meshes with a corresponding pinion 107 integral with a corresponding type wheel 108 free on a stud 109 secured in the plate 33, said type wheel 108 arranged to print records on the issuing label 46. Differential positioning of the secondary differential member 85 is transmitted through the gear 90 and the tube 91 to the gear 101 (Fig. 15), said gear in turn, through the gearing explained immediately above, positioning the corresponding type wheels 103 and 108 accordingly.

The type wheels 103 and 108 (Fig. 15) are provided with corresponding printing hammers 110 and 111, and, after said type wheels have been positioned, as explained above, the printing hammer 111 functions to carry the label 46 and an inking ribbon 112, interposed between said label and the type wheel 108, into contact with said type wheel, to print the value of the depressed price key on said label. Under normal circumstances, the hammer 110 for the detail strip 47 functions in unison with the printing hammer 111. However, in this particular arrangement, the hammer 110 is disabled in all adding operations and functions only in reading and resetting or totalizing operations to carry the detail strip 47 and the inking ribbon 112 into contact with the type wheel 103 to print a record corresponding to the setting of said wheel 103 upon said detail strip, as will be further explained later.

By referring to Fig. 2, it will be seen that the gear 93 has an arcuate slot 115, concentric with its center, which coacts with a stop rod 116, supported by the frames 30 and 31, to form a positive stop for said gear at the extremity of its movement in either direction, to prevent overthrowing or whipping of the differential mechanism upon full movement of the secondary member 85, while being restored to zero position or while being set to 9 position, under influence of the primary differential member 60.

Totalizer mechanism

The machine chosen to illustrate the present invention is provided with a single totalizer comprising a totalizer wheel 117 (Fig. 2) for each denominational order, rotatably supported on a rod 118, in turn supported in a rockable framework 119. The rocking movement of the framework 119 is controlled by the total control lever 44 (Figs. 1 and 16) to engage the totalizer wheels with the primary differential members 60, and to disengage said wheels from said members in proper timing to correspond to the type of machine operation being performed. The mechanism for rocking the totalizer framework 119 is not disclosed in the present application; however, if a knowledge of the operation of this mechanism is required, reference may be had to the Robertson patents referred to hereinbefore.

As previously explained, the only time the price keys 37 are used is in adding operations, and in such operations, after the primary member 60 has been positioned under influence of the depressed price key 37, and prior to return movement of said primary member, the corresponding wheel 117 of the totalizer is engaged with the large teeth in the periphery of said primary member. Counter-clockwise return movement of the primary differential member 60 rotates said totalizer wheel in an additive direction to enter therein the value of the depressed price key 37. A spring-actuated retaining pawl 120, mounted in the framework 119, is provided for coacting with the teeth of the corresponding totalizer wheel 117 to retain said wheel in set position during the time that it is disengaged from the primary member 60. Movement of the framework 119 to engage the totalizer wheel 117 with the primary member 60 causes a forward extension of the pawl 120 to engage an inward extension of a fixed angle bar 121, which rocks said pawl counter-clockwise to disengage it from the totalizer wheel 117 as said wheel moves into engagement with the teeth in the primary member 60. When the wheel 117 passes through zero, while traveling in an additive direction, a long tooth thereon operates a tens transfer mechanism, comprising a trip lever 122 (Fig. 2) to cause the adjacent higher order wheel to be advanced one tooth space or the equivalent of one digit to effect a transfer of tens digits from lower to higher denominations.

Figures 14, 15, 20:
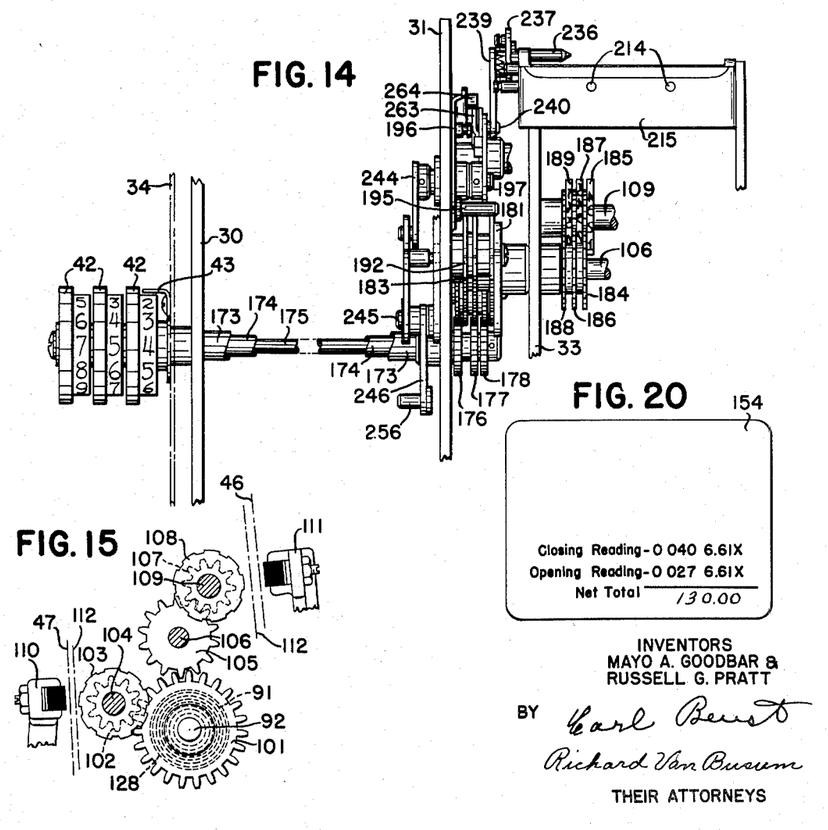
Fig. 14 is a front elevation of a fragmentary portion of the machine, showing in particular the mechanism for manual adjustment of the price per unit printing wheels.
Fig. 15 is a right side elevation of a portion of the mechanism for printing certain data on the labels, and in certain operations of the machine, upon a detail strip or an insertable slip.
Fig. 20 is a facsimile of a slip for use in the slip chute shown in Fig. 17.

By referring to Figs. 2 and 15, it will be seen that the secondary portion of the differential mechanism, comprising the secondary member 85, the indicator 96, and the type wheels 103 and 108, remains in set position at the end of machine operation and is restored to zero in the first part of the succeeding operation, after which they are rotated to their new positions. If it is desired to repeat the amount of a previous adding operation, all that is required is that the repeat key 41 (Fig. 1) be depressed to initiate a repeat operation in which the secondary differential member 85, which remains in the position in which it was set in the previous operation, is retained coupled to the primary differential member 60 by the coupling pinion 86, and in this case said secondary differential member, while being restored to zero position, repositions the primary member 60 to the position in which it was set in the previous operation. As a result, return movement of said primary differential member causes the amount of the previous operation to be set up on the indicators and type wheels and entered into the corresponding wheel 117 of the totalizer. It is to be noted that in this type of repeat mechanism it is unnecessary for the operator to anticipate or have any foreknowledge that the amount of the present operation is to be repeated.

Reading and resetting or totalizing operations

Moving a total control lever 44 (Figs. 1 and 16) from "adding" position, in which it is shown here, to either "reading" or "resetting" position conditions the totalizer engaging and disengaging mechanism to cause the totalizer wheel 117 to be engaged with and disengaged from the primary differential member 60 in either read or reset timing, depending upon the position of said total control lever.

In reading operations, the wheel 117 is engaged with the teeth of the primary differential member prior to initial movement of said member, which movement rotates said wheel in a reverse direction until the long tooth thereon contacts the end of the transfer lever 122. This stops the wheel 117 in zero position and positions the primary member 60 according to the value standing on said totalizer wheel. After the primary member 60 has thus been positioned, the pinion 86 (Fig. 2) couples said primary member to the secondary member 85, which has previously been restored to zero position by initial movement of the rod 99, as explained before. Return movement of the primary differential member from set position to normal or zero position carries the secondary member in unison therewith to position the indicator 96 and the type wheels 103 and 108 according to the value standing on said totalizer wheel 117. In reading operations, the totalizer wheel 117 remains in engagement with the primary differential member 60 during its return movement and is therefore restored to its original position. However, in resetting operations, the wheel 117 is disengaged from the primary member 60 after said member has been positioned thereby, and consequently said wheel 117 remains in a zeroized condition.

An alining mechanism (not shown) coacts with the primary differential members 60 and the secondary differential members 85 (Fig. 2) to retain said members in set position prior to engagement of the coupling pinions 86 therewith and prior to the functioning of the printing mechanism near the end of machine operations to retain said parts in accurate alinement at these times. Likewise, aliner mechanisms (not shown) coact with the gears 105 and the pinions 107 (Fig. 15) to retain the type wheels 103 and 108 in set position during functioning of the printing mechanism and at the end of machine operation.

In reading and resetting operations, the zero stop lever 58, which, as previously explained, coacts with the primary differential member 60, is rocked clockwise to ineffective position by movement of the total control lever 44 from "adding" position to either "reading" or "resetting" position.

Movement of the total control lever 44 to either "reading" or "resetting" position rocks the shaft 113 and an arm 123, secured on said shaft, counterclockwise. Counterclockwise movement of the arm 123 causes a stud 124 therein to engage the inner surface of the zero stop lever 58 and to rock said stop lever clockwise, against the action of its spring 59, out of the path of the forward extension of the primary differential member 60, so that said member is free to move without the depression of one of the price keys 37. Likewise, counterclockwise movement of the arm 123 moves a bent-over ear 125 on its upper end beneath an inward projection 126 on the flexible detent 56 to obstruct downward movement of said detent, thereby locking the keys 37 against depression in reading and resetting operations.

The total control lever 44 (Figs. 15 and 16) has a rearward extension, which is pivotally connected by a link 127 to a flanged portion of a sleeve 128, turnably supported on the circumference of the tube 91 for the lowest order of price keys 37. The sleeve 128 is clutched to one of the gears 101, which is connected by a train of gears, similar to that shown here, to corresponding type wheels supported on the studs 104 and 109, for positioning said wheels to print symbols, indicative of the type of operation being performed, upon the record material. In the present adaptation, there is no symbols for adding operations, the symbol "X" is printed to identify reading operations, and the symbol "Z" is printed to identify resetting operations. Also in the present arrangement, the reading and resetting symbols are printed only on the detail strip 47 because in such operations the printing and issuing mechanism for the label 46 is disabled, and consequently no labels are issued in such operations.

As explained above, the detail printing hammer 110 (Figs. 15 and 16) is disabled in adding operations and is rendered operative only in reading and resetting operations to print the results of such operations upon the detail strips 47. To prevent unnecessary feeding of the detail strip 47, the automatic feeding mechanism therefor has been disabled, and, inasmuch as only the results of reading and resetting operations are printed on said detail strip, the take-up or receiving roll therefor may be revolved manually to space these items apart and to bring them into viewing position opposite the window 48 in the cabinet 34 (Fig. 1.)

The detail hammer 110 (Fig. 16) is rotatably supported on a stud 129, secured in the right frame 31, and a spring 130 urges said hammer counter-clockwise to maintain a stud 131, carried thereby, in yielding contact with a downward extension of a hammer-operating lever 132, also free on said stud 129. A strong spring 133 urges the lever 132 clockwise to normally maintain a nose 134, on a hook-shaped inward extension thereof, in yielding contact with the periphery of a hammer-operating cam 135, secured on the main cam shaft 73 and rotating in unison therewith one counter-clockwise revolution each machine operation.

Figure 16:
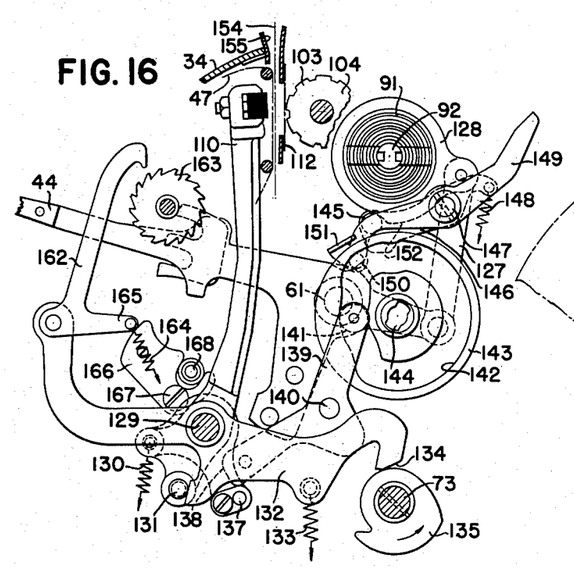
Fig. 16 is a right side elevation showing in particular the mechanism for operating and controlling the detail impression hammer and a part of the total control mechanism.

Initial movement of the cam 135 causes an inclined surface thereof, in cooperation with the nose 134, to rock the lever 132 counter-clockwise, against the action of the spring 133, to permit the spring 130 to cock the hammer 110 in preparation for a printing stroke. After the adjustment of the type wheels has been completed, an abrupt shoulder, formed between the highest and lowest portions of the cam 135, moves beyond the nose 134 to instantly release the lever 132 and the hammer 110 to the action of the comparatively strong spring 133, which sharply returns said lever and the hammer 110 clockwise, to cause said hammer to carry the detail strip and the inking ribbon into contact with the type wheels to print the result of the reading or resetting operation thereon.

The hammer 110 (Fig. 16) has, in a downward extension thereof, a stud 137, which cooperates with a camming surface 138 on a forward extension of a lever 139 free on a stud 140 secured in the right frame 31. An upward extension of the lever 139 carries a roller 141, which engages a cam groove 142 in the outer face of a knife-operating cam 143, rotatably supported on a stud 144, secured in the right frame 31. The cam 143 is connected by gears and a clutch mechanism to the main cam shaft 73 and makes one counter-clockwise revolution in unison therewith in each adding operation. Rotation of the cam 143 causes the groove 142, in cooperation with the roller 141, to rock the lever 139 counter-clockwise, at the beginning of adding operations, to move the camming surface 138 into the path of the stud 137 to obstruct counter-clockwise cocking movement of the hammer 110 upon operation of the lever 132. Consequently, in adding operations, the detail hammer 110 will be restrained from printing movement, and no imprint will be made upon the detail strip 47. After the printing mechanism has functioned, and near the end of machine operation, the cam 143 restores the lever 139 clockwise to move the surface 138 out of the path of the stud 137 to free said hammer for printing movement.

As stated above, the gearing which drives the knife-operating cam 143 is connected to the main shaft 73 by a releasable clutch mechanism which is controlled in its operation by the total control lever, to disconnect said cam from said main shaft in reading and resetting operations. As previously explained, movement of the total control lever 44 to either "read" or "reset" position (Fig. 16) rotates the sleeve 128 counter-clockwise. This causes a camming surface 152 on the flange of the sleeve 128, in cooperation with a stud 145 in an arm 146 secured on a shaft 147 journaled in the right frame 31, to rock said arm and said shaft counter-clockwise against the action of a spring 148. Also secured on the shaft 147, and rocking in unison therewith, is a lever 149, having a stud 150, which coacts with the releasable clutch mechanism (not shown but fully disclosed in the Robertson patents referred to hereinbefore) which connects the knife-operating cam 143 to its driving mechanism. Simultaneously, a bent-over ear 151 of the lever 149 engages a notch cut in the periphery of the cam 143 to hold said cam in the position shown here, to insure that it does not wander out of alinement with its clutch mechanism. Disabling of the cam 143 (Fig. 16) in reading and resetting operations causes the lever 139 to remain in its ineffective position, as shown here, and therefore, in such operations, the hammer 110 is free to function to print the results of the operation upon the detail strip 47, or in some cases upon an insertable slip 154, similar to that shown in Figs. 16, 17, and 20.

Figure 17:
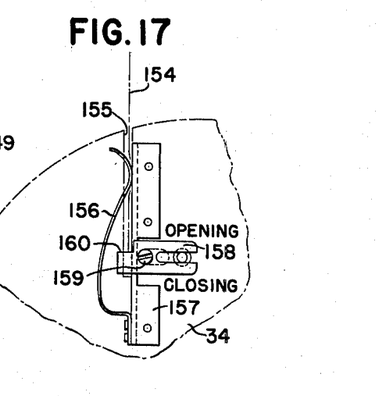
Fig. 17 is a detail view as observed from the right of the machine, showing the spring finger for retaining the insertable slip in the slip chute, and the slide for de-determining the printing position of said insertable slip.

A throat or chute 155, to receive the slip 154, is formed by a slot in the right side portion and adjacent top portion of the cabinet 34 (see also Fig. 1) and suitable lips and guide plates connected to the printer framework, to guide said insertable slip between the web of the detail strip 47 and the inking ribbon 112, as shown in Fig. 16, so that impressions may be made thereon when the hammer 110 operates. A spring finger 156, the lower end of which is secured to a right-angle face of a bracket 157 secured to the inside surface of the cabinet 34, has an upward curved portion which yieldingly engages said right-angle face of said bracket 157 to hold the slip 154 in proper position in the chute 155. A slip-locating slide 158 (Fig. 17) is mounted for horizontal shifting movement on the inner surface of the cabinet 34 and has an operating stud 159, which extends through a slot in said cabinet 34 to provide means for manually moving said slide from one position to the other. When the slide 158 is in its left-hand or "opening" position, as shown in Fig. 17, a shoulder 160, formed on said slide, extends into the throat or chute 155 to form a stop for engaging the bottom edge of the slip 154 to position said slip for printing the opening reading, as shown in Fig. 20. Moving the slide 158 to its right-hand position moves the shoulder 160 out of the chute 155, and in this case the bottom edge of the insertable slip 154 is moved into contact with the bottom of the slot formed in the cabinet 34, to locate said slip so that the closing reading will be printed in its proper position thereon. To obtain a net total of the value of all the labels issued in a certain class, all that is necessary is to subtract the opening reading from the closing reading, which in this case gives the net total of $130.00.

The cam 143 (Fig. 16), in addition to operating the lever 139, operates the knife for severing the completed label 46 from its web and also drives a cylinder which feeds the web of the label material in relation to the printing mechanism and the severing knife. The periphery of the cylinder likewise carries an electro for printing data of a descriptive or instructive nature upon the label 46, and said cylinder also has several settable printing wheels, used in this case for printing the grade and the quality of the contents of the packages upon said label 46.

The severing knife and the feeding and ejecting mechanisms for the label 46 are not shown herein, but reference may be had to the Robertson Patent No. 2,056,486 for a full disclosure of these mechanisms.

Counter-clockwise movement of the lever 149 (Fig. 16), when the total control lever 44 is moved to either "read" or "reset" position, causes the upper end of said lever to move into engagement with a stud (not shown) in the printing hammer 111 (Fig. 15) for the label 46, to obstruct unnecessary printing movement of said hammer in reading and resetting operations, as no label is issued in such operations.

Differential mechanism for the weight keys

The differential mechanisms for the ten-cent and one-dollar rows of price keys 37 are exactly like the differential mechanism for the lowest order or one-cent row of price keys 37, shown in Fig. 2 and described above. However, there is a difference in the construction of the differential mechanisms for the weight keys 38 and 39, as these keys are what are termed "printing keys" only and have no control over the entering of amounts in the wheels of the totalizer 117. However, the totalizer does have wheels 117 opposite these banks of printing keys, which act as overflow wheels for the price key banks 37, and said overflow wheels are actuated by the tens transfer mechanism in the usual and well-known manner to accumulate a total of the price. Inasmuch as it is necessary to provide means for reading and resetting the overflow wheels, each of the differential mechanisms for the weight banks 38 and 39 comprises, in addition to the usual differential members 60 and 85 (Fig. 2), a third differential member, which is operative only in reading and resetting operations and has teeth for coacting with the corresponding overflow wheels of the totalizer 117. The usual differential members 60 and 85 function in the same manner as described in connection with Fig. 2, to position the corresponding indicators and type wheels in accordance with the depressed weight keys 38 and 39. However, the primary differential members 60 for the weight banks have no teeth for coacting with the corresponding totalizer wheels 117 and consequently do not actuate said wheels.

The third differential members for the overflow totalizer wheels are always retained in ineffective or zero position in price-setting or adding operations. However, moving the total control lever 44 from "add" to "read" or "reset" position causes the third differential members to be latched to the corresponding primary differential members 60, which, it will be recalled, have no teeth for coacting with the totalizer wheels. Therefore, in reading and resetting operations, the primary differential members 60 for the weight keys and their corresponding third anism for the detail strip 47 has been rendered inoperable because it is not necessary for the detail strip to feed members operate as a unit and function exactly like the primary differential members for the price-setting banks 37, for the purpose of reading and resetting the corresponding overflow wheels, and for positioning the indicators and type wheels accordingly.

If a more detailed explanation of the differential mechanisms for the overflow banks is required, reference may be had to Fig. 5 and the description in connection therewith in the Robertson Patent No. 2,056,486.

Detail strip mechanism

As previously explained, the automatic feeding mechanism is operated each machine operation, and it is preferable that it be advanced manually only when required in reading and resetting operations. Pivotally mounted on an upward extension of the lever 132 (Fig. 16) is a detail strip feed pawl 162, having a tooth on its upper end arranged to coact with the teeth of a feeding ratchet 163 integral with a detail strip take-up or receiving roll (not shown) for rewinding the web of the detail strip 47 at it is unwound from the supply roll. A spring 164, one end of which is connected to a stud in a right-hand extension 165 of the pawl 162, urges said pawl clockwise to normally maintain its tooth in yielding engagement with the teeth of the ratchet 163.

In the machine as presently constructed, the rounded forward end of a plate 166 coacts with the extension 165 to retain the tooth of the feed pawl 162 out of engagement with the teeth of the ratchet 163, so that no automatic feeding movement will be imparted to said ratchet and the take-up or receiving roll. The plate 166 is properly located in relation to the end of the extension 165 and is secured against the printer back plate 33 by means of a slot in said plate which engages the large diameter of a stud 168, secured in said printer back plate 33, and by means of a screw 167, which clamps said plate 166 against the outer surface of said back plate 33. Any time it is desired or necessary to have the take-up roll function automatically to feed the detail strip in relation to the type wheels, all that is required is that the plate 166 be removed from the machine by removing the screw 167, in which case the pawl 162 will function normally as the lever 132 is rocked by the cam 135, as explained before, to advance the ratchet 163 and the take-up roll one increment of movement each machine operation to feed or line-space said detail strip in relation to the printing mechanism.

Price per pound setting mechanism

As explained near the beginning of this application, the hand knobs 42 (Figs. 1 and 14) are provided for setting corresponding type wheels to print the price per pound of the prepackaged commodities upon the label 46. The dollar setting knob 42 (Fig. 14) is secured to the left-hand end of a tube 173 journaled in the frames 30 and 31, the tens of cents setting knob 42 is secured to the left-hand end of a tube 174 journaled within the tube 173, and the units of cents setting knob 42 is secured to the left-hand end of a shaft 175 journaled within the tube 174. The right-hand ends of the tubes 173 and 174 and the right-hand end of the shaft 175 have secured thereto corresponding pinions 176, 177, and 178. The pinion 178 for the one-dollar knob 42 (Figs. 12 and 14) meshes with a corresponding gear 179 free on a stud 180 supported between the right frame 31 and a sub-plate 181 secured to said right frame. The gear 179 is connected by a sleeve to a companion gear 182, which meshes with a gear 183 free on the stud 106 and connected by a sleeve to a companion gear 184, also free on said stud 106. The gear 184 meshes with and drives a companion gear integral with a corresponding type wheel 185 for printing the dollar values of the price per pound upon the label 46. Likewise, the pinion 177 for the tens of cents setting knob 42 meshes with and drives a gear similar to the gear 179, in turn meshing with and driving a gear similar to the gear 183, which is connected by a sleeve to a companion gear 186, which drives a corresponding type wheel 187 for printing the tens of cents values of the price per pound upon the label 46. In a similar manner, the pinion 176 for the units of cents setting knob 42 meshes with and drives a gear similar to the gear 179, said gear in turn being connected to a corresponding gear similar to the gear 182, which meshes with a companion gear similar to the gear 183, which is in turn connected by a sleeve to a corresponding gear 188, which drives the corresponding type wheel 189 for printing the units of cents values on the label 46. The type wheels 185, 187, and 189 (Figs. 14 and 15) are freely supported by the stud 109, which, it will be recalled, supports the type wheels 108 for printing the price of the packaged commodities upon the label 46.

It should be noted that the sleeves which connect the gears 183 (Figs. 12 and 14) to their corresponding gears 184, 186, and 188 bear, respectively, upon the stud 106 and upon each other in nested fashion, the same as the tubes 173 and 174 for the positioning knobs 42.

As previously explained, the guide plate 43 (Fig. 1), secured to the left outer face of the cabinet 34, has therein a notch which coacts with the numerals on the knobs 42 for use in positioning said knobs and the corresponding type wheels 185, 187, and 189 (Figs. 12 and 14), so that the proper price per pound will be printed upon the labels 46.

Mechanism under control of the positioning knobs 42 (Fig. 14) is provided for blocking or obstructing downward releasing movement of the starting bar 35 (Fig. 12) and the release slide 65, as said knobs are being indexed from one position to another, to insure that said knobs and the corresponding type wheels 185, 187, and 189 are properly positioned and are not inadvertently left midway between two positions. The blocking mechanism also prevents turning of the knobs 42 during operation of the machine.

Figure 13:
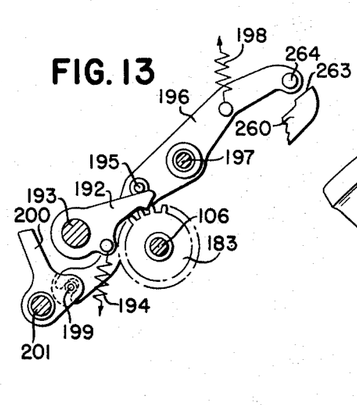
Fig. 13 is a detail view of a part of the control mechanism shown in Fig. 12.

Each of the three gears 183 for the knobs 42 has coacting therewith the tooth of a corresponding retaining pawl 192 (Figs. 12 and 13) free on a stud 193 secured in the frame 31, each of said pawls being urged clockwise by a corresponding spring 194 to maintain the teeth of said pawls in yielding engagement with the teeth of the corresponding gears 183. The upper ends of the pawls 192 (Fig. 13) underlie a stud 195 in a lever 196 free on a short shaft 197 journaled in a bushing in the right frame 31 (see also Fig. 14). A spring 198 urges the lever 196 counter-clockwise to normally maintain the stud 195 in yielding engagement with the upper ends of the pawls 192. A downward extension of the lever 196 has a slot which freely engages a stud 199 in a pawl 200 free on a stud 201 in the frame 31.

As the knobs 42 (Fig. 14) are rotated or indexed to set up the price per pound, the corresponding gears 183 are rotated in unison therewith. This causes the teeth in said gears 183, coacting with the teeth of the corresponding pawls 192, to rock said pawls first counter-clockwise (Fig. 13) and then back to normal position, under influence of the corresponding springs 194, as the teeth of said gears ratchet over the teeth of said pawls 192. Counter-clockwise movement of any of the pawls 192 causes its upper end, in cooperation with the stud 195, to rock the lever 196 clockwise, against the action of the spring 198, which movement simultaneously rocks the pawl 200 counter-clockwise to move its upper end into the path of a flat portion on a stud 202 (Fig. 12) secured in the upper end of the slide 65, to obstruct downward releasing movement of said slide and thus prevent operation of the machine. As the gears 183 move from one tooth space to another, the spring 194 restores the lever 196 counter-clockwise and the pawl 200 clockwise out of the path of the stud 202 to permit downward releasing movement of the slide 65 and the release bar 35, when the parts are properly positioned.

Conversely, depression of the starting bar 35 and the slide 65 moves the stud 202 into the path of the pawl 200 to obstruct clockwise movement of the lever 196 and thus hold the pawls 192 in engagement with the teeth of their corresponding gears 183 to prevent turning of the setting knobs 42 during machine operation and thus secure said knobs and the corresponding type wheels in set position.

In addition to the retaining pawls 192 (Figs. 13 and 14), the usual type wheel aliner mechanism coacts with the teeth of the gears 184, 186, and 188 and the type wheels 185, 187, and 189 to aline said parts in set position during functioning of the printing mechanism.

*Commodity stamp mechanism*

As previously explained, the machine chosen to illustrate the present invention is arranged for printing and issuing labels to be placed on or in packages of various kinds of meats. However, this is but one example of use, as the system is readily adaptable to provide labels for use in connection with many other types of packaged commodities.

In the present system, one of the removable and insertable commodity-printing stamps or keys 50 (Figs. 1, 4, 5, 7, and 8) is provided for each type of meat to be packaged, and, as previously explained, these keys are stored in corresponding indexed slots in a rack or magazine 51 (Fig. 10), from which they may be quickly selected and removed for insertion in the machine. The various keys 50 are identical in construction, the only difference being in the name provided on a porous rubber stamp portion 203, opposite ends of which fit in opposed retaining clips 204, in turn secured to one face of the key 50, the inner surfaces of said stamps also being cemented to said face of the keys 50. Inasmuch as all of the keys are similar in construction, the key shown in Fig. 7 will be described as representative of all the keys required to print the names of the various types of meats upon the labels 46.

The commodity-printing key 50 (Fig. 7) comprises a knurled finger portion 205, for use in conveniently removing and inserting said key, and the parallel edges of said key are tapered or dovetailed, as indicated by numerals 206 (Figs. 4 and 7), to readily engage and slide freely in a groove or slot 211 (Figs. 4 and 5) formed by bent-over inner ends of plates 207 secured in opposed relationship to each other between the upper and lower surfaces of a printing block 208, the inner surface of said printing block coacting with said plates 207 to form a backing for the key 50. The outer ends of the plates 207 are flared inwardly, as shown at 209 (Fig. 5), to form an enlarged throat for the slot 211 to facilitate insertion of the key 50 therein. The inner end of the key 50 is tapered, as shown at 210 (Fig. 7), to also facilitate the ready insertion of said key into the throat for the slot 211.

As previously explained, the stamp portion 203 of the keys 50 (Figs. 7 and 8) is made of porous rubber, which quickly absorbs and retains a supply of ink sufficient for printing the name of the commodity represented thereby upon many of the labels 46, before reinking is required. Suitable means for reinking the porous rubber stamps 203 in a relatively short time, and with minor inconvenience, is provided.

By referring to Figs. 5 and 6, it will be seen that the printing block 208 for supporting the printing keys 50 is provided with two bores 213, which are a slip fit on corresponding guide pins 214 secured in an angular bracket 215 secured to the printer plate 33, said block being shiftably supported on said guide pins between parallel inner and outer side portions of said bracket 215. Opposite ends of the block 208 carry axially-alined studs 216 (Figs. 3 and 5) engaged by slots in the upper ends of two similar cranks 217 secured on opposite ends of a shaft 218 turnably supported in side portions of the bracket 215. Also secured on the shaft 218 is a crank 219, having pivotally connected thereto the upper end of a link 220, the bottom end of which is pivotally connected to a crank 221 connected by a hub 226 to a cam arm 223, said hub 226 being free on a stud 222 secured in the plate 33. The arm 223 has a downwardly-extending nose 224, which coacts with the periphery of an operating cam 225 secured to the inner face of the knife-operating cam 143 (see also Fig. 16). A spring 227 urges the link 220 upwardly to normally maintain the rounded nose 224 in yielding contact with the periphery of the cam 225 and to urge the impression block 208 to its outward or ineffective position, as shown here.

Figures 7, 8, 9, 10, 11:
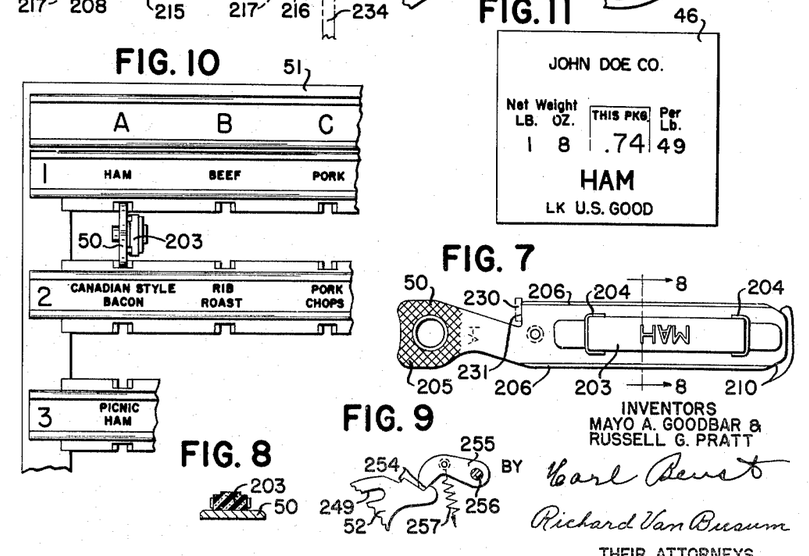
Fig. 7 is a detail view of one of the insertable and removable printing elements.
Fig. 8 is a sectional view taken along line 8—8 (Fig. 7), looking in the direction indicated by the arrows.
Fig. 9 is a detail view of the retaining pawl for the printing element control mechanism.
Fig. 10 is a fragmentary view of one corner of a rack or magazine for filing or storing the different printing elements in an orderly and convenient manner.
Fig. 11 is a facsimile of a label printed and issued by the machine embodying the present invention.

It will be recalled that the cam 143 makes one counter-clockwise revolution in adding operations and that in reading and resetting operations it remains stationary. Consequently, the cam 225 for operating the block 208 operates exactly like said knife cam 143, as it is fixed thereto. Counter-clockwise rotation of the cam 225 causes a node 228 on its periphery, in cooperation with the rounded nose 224, to shift the link 220 downwardly against the action of the spring 227 to shift the impression block 208 inwardly on its guide pins 214. Inward movement of the impression block 208 and the commodity stamp key 50 causes said stamp portion 203 to engage the label 46 and press said label against the inner surface of the back portion of an upper label chute 229, which is removably connected to the printer framework, to print the name of the packaged commodity upon said label 46. The printing of the name of the commodity upon the label 46 occurs after said label has been severed from its web, after the impression hammer 111 (Fig. 15) has operated, as explained earlier herein, and during a dwell in the ejecting movement of said label 46, so that said name will be printed in the proper location, as shown in Fig. 11. After the node 228 (Fig. 3) moves beyond the nose 224, the spring 227 returns the link 220, the impression block 208, and the key 50 to their normal positions, as shown here.

Means, including a sensing finger 230 (Figs. 4 and 7), which coacts with a shoulder 231 formed on the stamp key 50, prevents operation of the machine unless the key is fully and properly inserted in the slot 211. The finger 230, coacting with the shoulder 231, likewise secures or retains the key 50 in proper position in the slot 211, until said finger is moved to ineffective position by operation of the control lever 52 (Figs. 1 and 3). Mechanism associated with the sensing finger 230 prevents restoration of said finger from ineffective to effective position and thereby prevents operation of the machine, unless the price-per-pound setting knobs 42 are manipulated to change the price-per-pound figure to correspond to the stamp or commodity printing key 50 being used.

The sensing finger 230 (Figs. 4 and 7) is secured on the outer end of a shaft 232 rotatably supported in the parallel arms of a bracket 233 secured to the upper chute 229, which is removably supported by the printer plate 33 and a ribbon support plate 234 (Fig. 5). Secured on the inner end of the shaft 232 (Figs. 3 and 4) is an arm 235 having a slot engaged by a stud 236 in a bell crank 237 fixedly connected by a hub to a composition arm 239, said hub being free on a stud 238 in the bracket 215. The arm 239 has a slot which engages a stud 240 in a crank 241 secured on the outer end of the shaft 197, which, as previously explained, is journaled in the frame 31. Fast on the inner end of the shaft 197 is a bell crank 244 (Figs. 3 and 12), a downward arm of which carries a stud 245 which engages a slot in a rearward extension of a lever 246 free on a stud 247 fast in the frame 31. The lever 246 carries a stud 248, which engages a slot 249 in the lever 52 turnably mounted on the stud 247, said slot being concentric with the center of said stud. Springs 250 and 251 urge the bell cranks 244 and 237 clockwise and counter-clockwise, respectively, to cause the stud 236, in cooperation with the arm 235 (Fig. 4) to normally maintain a stop stud 252, in said arm, in yielding engagement with the bottom surface on an extension 253 of the inner arm of the bracket 233.

The manually-operable lever 52 has a rearward extension with two locating notches 254 (Figs. 3 and 9) therein corresponding to the effective or "on" position of said lever and the ineffective or "off" position of said lever, which notches coact with a depending tooth on a retaining pawl 255 free on a stud 256 in the frame 31. A spring 257 urges the pawl 255 downwardly to maintain the retaining tooth thereon in yielding engagement with the locating notches 254 to yieldingly retain the lever 52 in either of its positions.

When the lever 52 is in "on" position (Figs. 3 and 12), the finger 230 is positioned as shown in Figs. 4 and 7 and, in cooperation with the shoulder 231 on the stamp key 50, retains said key in correct printing position in the slot 211. When it is desired to remove the key 50, moving the lever 52 from "on" position to "off" position causes the forward end of the slot 249, in cooperation with the stud 248, to rock the lever 246 clockwise, which movement, through the bell crank 244 and the crank 241, rocks the arm 239 and the bell crank 237 also clockwise against the tension of the spring 251. Clockwise movement of the bell crank 237, through the stud 236 (Fig. 4), rocks the arm 235, the shaft 232, and the finger 230 clockwise in unison therewith, to move the forward end of said finger upwardly out of the path of the shoulder 231 on the stamp key 50, to free said key for removal from the slot 211, so that it may be replaced with another key for printing a different name on the labels 46. Clockwise movement of the lever 246 (Figs. 3 and 12), when the lever 52 is moved from "on" to "off" position, moves a stud 242 in a downward extension of said lever beneath a surface 243 on the machine release lever 68 to obstruct clockwise machine-releasing movement of said lever when the finger 230 is in ineffective position for the removal and insertion of the stamp keys 50. Conversely, clockwise releasing movement of the lever 68 moves an ear formed on the inner end of said lever into the path of the stud 242 to obstruct movement of the levers 246 and 52 from "on" to "off" position during machine operation.

Counter-clockwise movement of the shaft 197 and the crank 241, when the lever 52 is moved from "on" to "off" position, causes a square stud 258 (Fig. 12), carried by said crank 241, to move beyond a shoulder 259 on a latch arm 260 free on a stud 261 in the frame 31, whereupon a spring 262 rocks said arm 260 counter-clockwise to move said shoulder 259 into the path of said stud 258 to obstruct clockwise return movement of the crank 241, and this in turn obstructs return movement of the connected parts, including the lever 246 and the finger 230, under influence of their springs 250 and 251. Under these conditions, the slot 249 permits return of the lever 52 from "off" to "on" position without disturbing the associated parts, which continue to be retained in "off" position by the latch arm 260, and consequently the machine remains inoperative. Counter-clockwise latching movement of the arm 260 (Figs. 12 and 13) moves a raised surface 263 on an upward extension thereof into coacting relationship with a stud 264 secured in the upper end of the lever 196, which lever, as previously explained, is alternately rocked clockwise and back to normal position, as the setting knobs 42 (Figs. 1 and 14) are revolved, to set the corresponding type wheels to the desired price per pound. Clockwise movement of the lever 196 causes the stud 264 to rock the arm 260 clockwise in unison therewith to disengage the shoulder 259 from the stud 258 to free the crank 241 and connected parts to the action of the springs 250 and 251, which immediately restore said parts to normal or "on" position.

If the stamp key 50 is not properly inserted in the slot 211, restoring movement of the finger 230 in a counter-clockwise direction will be obstructed. As a result, the connected parts, including the lever 246, will be held against restoring movement, and in this case the stud 242, in cooperation with the surface 243, will continue to obstruct clockwise machine-releasing movement of the lever 68. Proper insertion of the key 50 in the slot 211 moves the shoulder 231 beyond the finger 230, thus freeing said finger and connected parts to the action of the springs 250 and 251, which immediately restore said parts to normal or "on" position, as shown in Fig. 3.

As previously explained in connection with Fig. 4, the upper chute 229 for the web of the label material 46 is removably mounted in the printer framework, and the parts, including the bracket 233, the shaft 232, the finger 230, and the arm 235, which are attached to said upper chute, are necessarily removable in unison therewith, in which case the slot in said arm 235 slips freely off of the stud 236. When the arm 235 is disconnected from the stud 236, the extension 253, coacting with the stud 252, no longer retains the bell crank 237 against the action of the spring 251, and in this case a stop stud 265 (Fig. 3), secured in the bracket 215, coacts with said bell crank to retain the parts against unnecessary movement under influence of the spring 251, and thus to retain the stud 236 in proper position to be reengaged by the slot in said arm 235 when the upper chute 229 is reassembled in the printer framework.

*Interlock between label supply roll and machine-releasing mechanism*

Mechanism coacting with the supply roll of label material 46 (Fig. 18) is provided for automatically locking the machine against operation when the supply of label material nears exhaustion, to inform the operator of this fact, so that the delay and inconvenience caused by unexpectedly running out of label material will be eliminated.

The supply of label material 46 (Figs. 18 and 19) is contained in a comparatively large roll wound onto a core 267, composed of compressed paper or wood and having a central bore which is a slip-fit on the circumference of a sleeve 268 rotatably supported on a stud 269 secured in the printer plate 33. Diametrically opposed teeth (not shown), protruding from the circumference of the sleeve 268, cut their way into the bore in the core 267 as the supply roll is pushed onto said sleeve to anchor said parts for unitary rotation. A spring (not shown), wound around the stud 269 and coacting with an enlarged portion of the bore in the sleeve 268, creates frictional drag between said stud and said sleeve to prevent overrunning of the supply roll 46 when the label material is unwound therefrom. A large disk 270, freely supported by the stud 269, between the outer face of the plate 33 and the inner end of the sleeve 268, coacts with the inner surface of the supply roll 46 to provide essential support therefor.

The periphery of the supply roll 46 (Fig. 18) is yieldingly engaged by a sensing roller 271 rotatably mounted on a stud 272 in the lower end of a sensing arm 273 fixedly connected to a companion bell crank 275 by a sleeve 274 rotatably supported by a stud 276 fast in a bracket 277 secured to the plate 33. A spring 278, one end of which is fixed and the other end of which is connected to the downward extension of the bell crank 275, urges said bell crank and the arm 273 counterclockwise to normally maintain the roller 271 in yielding contact with the periphery of the supply roll 46. An inwardly-extending arm of the bell crank 275 is pivotally connected by a link 279 to the lower arm of a lever 280 free on a stud 281 secured in the frame 31. The upward arm of the lever 280 carries a stud 282, which coacts with a control surface 283 on a control arm 284 fixedly connected by a hub 285 to a companion lever 286, said hub being turnably supported by a stud 287 secured in the frame 31. An extension of the control surface 283 is formed by a portion of a pawl 288 freely mounted on a stud in the arm 284. A spring 289 urges the pawl 288 counter-clockwise (Fig. 18) to normally maintain a finished surface on an upward extension of said pawl in contact with a stop stud 290 in the arm 284.

Figures 18, 19:
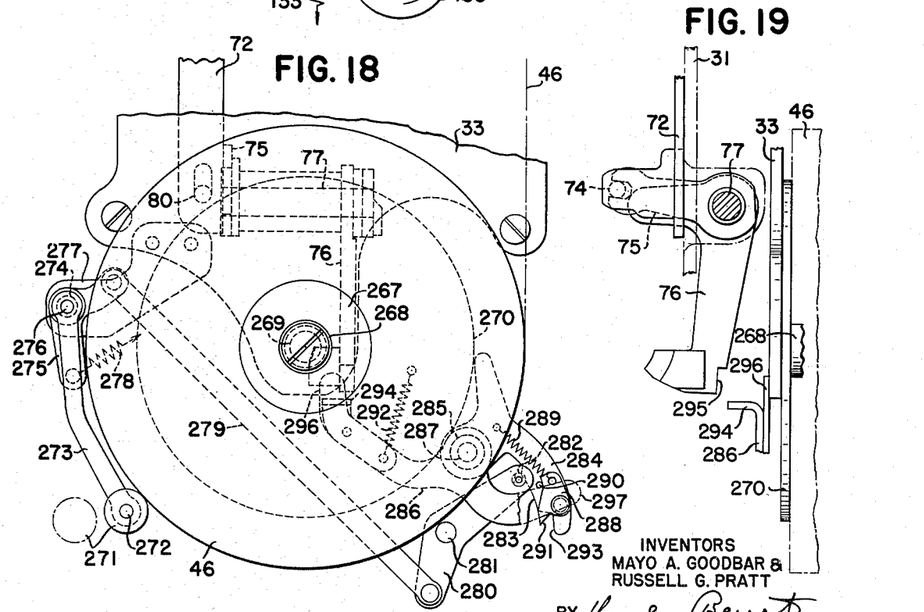
Fig. 18 is a fragmentary detail view, as observed from the right of the machine, showing in particular the supply roll of label material and mechanism coacting with the periphery of said supply roll to automatically lock the machine against operation when the supply of label material is nearly exhausted.
Fig. 19 is a detail view of the clutch control lever, shown also in Fig. 18, and a portion of the mechanism associated therewith for obstructing machine-releasing movement of said control lever when the supply of label material is substantially exhausted.

As the supply of label material 46 diminishes, and the diameter of the supply roll decreases, the periphery of said supply roll, coacting with the roller 271, permits the spring 278 to gradually move the arm 273 and the bell crank 275 counter-clockwise, which movement, through the link 279, moves the lever 280 clockwise in unison therewith.

Clockwise movement of the lever 280 causes the stud 282 to ride downwardly on the control surface 283 and finally onto the extension of said control surface formed by the pawl 288. When the supply of label material 46 is practically exhausted, the stud 282 rides off of a sharp shoulder 291 (Fig. 18) formed by the extension of the control surface 283 on the pawl 288, thus releasing the arm 284 and the lever 286 to the action of a spring 292, which immediately rocks said parts clockwise until a stop surface 293 on said arm 284 contacts the stud 282 to terminate such clockwise movement. Clockwise movement of the lever 286 moves an ear 294, formed on the inner extension thereof, into the path of an undercut surface 295 (Fig. 19) on the clutch control lever 76 to obstruct counter-clockwise releasing movement of said lever and thereby prevent operation of the machine after the supply of label material has become substantially exhausted.

For the purpose of removing the core 267 from the sleeve 268 and the installation of a new supply roll 46 thereon, the arm 273 may be manually moved to an outward ineffective position, indicated by the dot-and-dash lines for the roller 271 in Fig. 18, during which movement the lever 280 is restored counter-clockwise, the stud 282 by-passing the shoulder 291 formed on the pawl 288, and riding over an inclined surface formed between the stop surface 293 and the control surface 283 on the arm 284. As the arm 273 is moved to its extreme clockwise position, the stud 282 rides off of the surface 283 and into a depression, thus permitting the spring 292 to again rock the lever 286 and the arm 284 clockwise to move the ear 294 again into the path of the surface 295 to obstruct releasing movement of the clutch control lever 76. The shoulder formed by the depression at the inner termination of the control surface 283, coacting with the stud 282, holds the lever 280 and the arm 273 in their ineffective positions against the action of the spring 278, so that the core 267 of the exhausted supply roll 46 may be readily removed from the sleeve 268 and a new supply roll mounted thereon, without any interference from said arm 273 and the roller 271. Secured on the upper end of the lever 286 (Figs. 18 and 19) is a plate 296 having an upward extension, which coacts with the inner surface of the printer plate 33 to maintain proper side-spacing relationship between said lever 286 and said frame.

A rearward or right-hand extension 297 of the lever 286 (Fig. 18) forms a convenient finger piece, by means of which said lever may be rocked counter-clockwise against the action of the spring 292, to disengage the shoulder formed by the depression at the inner termination of the control surface 283 from the stud 282 to release the lever 280 and the arm 273 to the action of the spring 278, which immediately restores said arm counter-clockwise to move the roller 271 into yielding contact with the periphery of the new supply roll of label material 46. This restoration of the arm 273 positions the lever 280 as shown in Fig. 18, so that the stud 282, in cooperation with the control surface 283, retains the ear 294 out of the path of the surface 295 (see also Fig. 19), so as not to interfere with normal operation of the machine.

From the supply roll 46, the web of the label material is directed upwardly, as shown in dot-and-dash lines in Fig. 18, through the usual lower guide chute, between the serrated feed rails of the cylinder mechanism and the rubber pressure roller, which coacts with said rails to feed said web upwardly past the knife mechanism, thence into coacting relationship with the type wheels 108, the hammer 111, and the stamp key 50, and finally into coacting relationship with the label-ejecting mechanism, which ejects the upwardly-disposed edge of the label 46 out of the upper chute 229, as shown in Figs. 1 and 4. A light spring finger (not shown), located in the upper paper chute 229, grips the completed label 46 sufficiently to prevent it from being fully ejected from said chute and holds said label in a convenient position, shown in Fig. 1, where it is conveniently accessible for removal by the operator.

The machine is provided with a non-resettable "Veeder" type of step-by-step counter 298 (Fig. 1), which is visible through a suitable opening in the front of the cabinet 34. This counter accumulates "one" each time an adding operation is performed, including repeat operations, and may be used for any desired purpose. Inasmuch as the counter accumulates "one" each time a label is issued, it may be used to count the number of packages prepared of any particular type of commodity, or to count the total number of packages prepared for any particular business period.

OPERATION

It is believed that a full understanding of the method of operating the machine embodying the present invention will have been obtained from a perusal of the preceding specification; nevertheless, a brief outline of operation or summary of operation may be helpful and will now be given.

The machine chosen to illustrate the present invention is arranged for use in printing and issuing labels for identifying the contents, weight, price per pound, price per package, and grade of packages containing meats of various kinds and grades. However, this is but one example of use of the machine, and it is not intended or desired to limit the machine to the preparation and issuing of labels for any particular purpose or commodity, as, with minor alterations, said machine may be arranged to prepare labels for various purposes, and for use in connection with many types of prepackaged commodities.

In many so-called self-serve chain stores and supermarkets, meats of various kinds and grades are prepared and packaged at convenient times for subsequent sale. Meats thus prepared are usually wrapped in some suitable type of transparent materials, such as cellophane, and arranged in refrigerated display cases where the customer may serve himself by selecting the package containing the desired quantity, type, and grade of meat. Previously-used methods of providing the required information concerning the packages and their contents had proven unsatisfactory for one reason or another, and therefore there was an urgent need for an efficient and economical means of preparing a label for each package, said labels containing the required information for properly identifying the contents of the packages, and it is believed that this application discloses entirely suitable and satisfactory means for supplying this need.

In conditioning the machine for printing and issuing a label for a particular kind of prepackaged meat, the label control lever 52 (Figs. 1 and 3) is first moved upwardly from "on" to "off" position to release the previously-used stamp key 50 so that it may be removed from the machine and returned to its proper location in the rack 51 (Fig. 10), after which the proper key 50 may be selected from said rack and inserted in the slot provided therefor in the slot 211 in the impression block. It will be remembered that moving the label control lever 52 to "off" position also locks the machine against operation. After the proper key 50 has been inserted in the machine, the label control lever 52 is restored to "on" position, however, this in itself is not sufficient to condition the machine for operation, and it is necessary to manipulate the price-per-pound-setting knobs 42 to set up the new price per pound of the type of meat for which the present label is being prepared, before the machine can be operated.

After the proper price per pound has been set up on the knobs 42 (Fig. 1), the weight of the package is ascertained, and this weight is set up on the weight keys 38 and 39, after which the price of the contents of the package is set up on the price keys 37. Operation of the machine is then initiated by depression of the starting bar 35, and during machine operation a label similar to that shown in Fig. 11 is printed and issued, which label gives the required detailed information concerning the package of meat, including the price per pound, the total weight, in pounds and ounces, of the package, the price of the contents of the package, the name of the particular kind of meat contained in the package, and the grade of said meat. In addition to the information outlined above, the printing mechanism includes an electro-type for printing information of a descriptive or other nature, including the name of the market or grocery, upon any available portion of the face of the label 46.

The back portion of the label 46 is provided with an adhesive which is effective upon the application of heat to secure the label to the surface of the package, and this is best done immediately after the label has been printed, to eliminate the danger of misplacing or substituting labels. In some cases, where transparent wrapping is used for the packages of meat, the label is placed directly upon the meat before it is wrapped, which is satisfactory in every way, as the printing on the label is clearly visible through said transparent wrapping.

In certain instances, it is desirable to ascertain the retail value of all of the packages of a certain kind or class of commodity, and this may be conveniently accomplished, prior to the issuing of labels for such commodity, by moving the total control lever 44 (Fig. 1) to "read" position, adjusting the slide 158 to its "opening" position, as shown in Fig. 17, properly inserting the slip 154 (Fig. 20) in the chute provided therefor, and initiating a read or sub-total operation of the machine by depressing the starting bar 35. During this opening reading operation, a sub-total of the amount contained in the price totalizer is printed upon said slip adjacent the "Opening Reading" notation thereon. Next, the slip 154 is removed from the machine, and the total control lever 44 is moved from "read" position to "add" position, and, in a series of label-issuing operations, labels are provided for, and attached to, all of the packages in this particular class. After labels have been issued for all of the packages, the total control lever 44 is again moved to "read" position, the slide 158 (Fig. 17) is adjusted to its "closing" position, and the slip 154 is again inserted in the chute provided therefor. Next, a machine operation is initiated by depressing the starting bar 35, and during this operation the price totalized is again read or sub-totalized and the value of the amount standing thereon is printed adjacent the "Closing Reading" designation on the slip 154. To ascertain the retail value of the packages in this particular class, all that is required is that the opening reading be subtracted from the closing reading, which in this case produces a net total of $130.00, which is the retail price of all of the packages in said particular class.

At the termination of a run of a particular class of labels 46, it may be desirable to reset or zeroize the price totalizer, and this may be accomplished by moving the total control lever 44 to "reset" position and initiating a reset operation by depressing the starting bar 35. During this reset operation, the price totalizer is reset to zero, and the value taken therefrom is printed upon the detail audit strip 47 (Fig. 7), which may then be advanced manually until the recording of the total is visible through the window 48. It will be recalled that in reading and resetting operations the mechanism which controls the printing and issuing of the labels 46 is automatically disabled, and consequently no labels are issued in such operations.

While the form of mechanism herein shown and described is admirably adapted to fulfill the objects primarily stated, it is to be understood that it is not intended to confine the invention to the one form or embodiment disclosed herein, for it is susceptible of embodiment in various forms, all coming within the spirit and scope of this invention.

What is claimed is:

1. In a machine of the character described, constructed and arranged to perform operations in which labels are printed and issued, the combination of a removable printing element to print certain data on the labels; a receptacle for the element; a shoulder on the element; means including a finger coacting with the shoulder to secure the element in the receptacle when said element is properly inserted therein; means connected to the finger and operable to move said finger to ineffective position; yieldable means connected to the moving means and effective to urge the finger to effective position; a latch to hold the moving means and the finger in ineffective position; means on the moving means to prevent machine operation when said moving means and the finger are in ineffective position; and manually operable means effective upon operation to release the latch so that the yieldable means may return the moving means and the finger to effective position to permit operation of the machine and to enforce operation of said manually operable means.

2. In a machine of the class described, constructed and arranged to perform operations in which labels are printed and issued and having means to initiate such operations, the combination of a settable device, settable to print data of a variable nature on the labels; a removable printing element to print certain other data on the labels; a receptacle for the element; a shoulder on the element; retaining means constructed and arranged to coact with the shoulder; means connected to the retaining means for operating same; yieldable means connected to the operating means and effective to urge the retaining means into the path of the shoulder, when the element is properly inserted in the receptacle, to secure said element in said receptacle; a manually operable lever coacting with the operating means when moved in one direction to move the retaining means out of the path of the shoulder, said lever constructed and arranged to be returned contrary to said one direction independently of the operating means and the retaining means; a latch coacting with the operating means to hold the retaining means out of the path of the shoulder when the lever is returned; means operated by the settable device to release the latch to permit the yieldable means to restore the retaining means into the path of the shoulder; and means on the operating means coacting with the initiating means to prevent operation of the machine when said retaining means is out of the path of the shoulder and to prevent operation of said operating means during machine operation.

3. In a machine of the character described, constructed and arranged to perform operations in which labels are printed and issued, said machine having means including a rockable member to initiate such operations, the combination of a settable device to print data of a variable nature on the labels; a removable element to print other data on the labels; a receptacle for the element; a shoulder on the element; a finger constructed and arranged to coact with the shoulder; operating means for moving the finger to ineffective position; yieldable means for moving the finger to effective position where it will sense the presence of and move into the path of the shoulder when the element is properly inserted in the receptacle to secure said element therein; means controlled by the finger and its operating means for preventing movement of the rockable member and thus preventing initiation of a machine operation when said finger is in ineffective position; means including a latch to hold the finger in ineffective position for the removal and insertion of the printing element; and means operated by the settable device to release the latch to render the finger effective to sense for the shoulder and to simultaneously enforce setting of said settable device.

4. In a machine of the class described, constructed and arranged to perform operations in which labels are printed and issued, the combination of a settable device to print data of a variable nature on the labels; a removable element to print other data on the labels; a receptacle for the element; a shoulder on the element; a finger constructed and arranged to coact with the shoulder when the element is properly inserted in the receptacle; yieldable means to move the finger into the path of the shoulder when the element is properly inserted in the receptacle to secure said element in said receptacle; manually operable means to move the finger out of the path of the shoulder; means including a rockable member to initiate machine operation; coacting portions on the manually operable device and the rockable member, said portions constructed and arranged to coact alternately to obstruct machine releasing movement of the member when the finger is out of the path of the shoulder and to prevent operation of said manually operable means when the member has been rocked to initiate machine operation; means including a latch to hold the finger out of the path of the shoulder; and means operable by the settable device to release the latch to permit the finger to move into the path of the shoulder and to simultaneously enforce setting of said settable device.

5. In a machine of the class described, constructed and arranged to perform machine operations in which labels are printed and issued, the combination of a settable device for printing data of a variable nature on the labels; a removable element for printing other data on the labels; a receptacle for the element; a shoulder on the element; a finger constructed and arranged to coact with the shoulder when the element is properly inserted in the receptacle; yieldable means normally effective to move the finger into the path of the shoulder when the element is properly inserted in the receptacle; manually operable means connected to the finger and operating to move said finger out of the path of the shoulder; means including a latch coacting with the manually operable means to hold the finger out of the path of the shoulder so that the element may be removed from or inserted in the receptacle; means connected to the manually operable means and operable thereby for preventing machine operation when the finger is out of the path of the shoulder; and means operable by the settable device to release the latch to free the finger to the action of the yieldable means which moves said finger into the path of the shoulder, to enforce setting of said settable device before the machine can be operated.

6. In a machine of the class described, constructed and arranged to perform operations in which labels are printed and issued, the combination of a removable element for printing certain data on the labels; a shoulder on the element; yieldably operated means normally effective to coact with the shoulder to retain the element in proper position in the machine; means to move the retaining means out of coacting relationship with the shoulder; means normally effective and coacting with the moving means to hold the retaining means out of coacting relationship with the shoulder; means actuated by the moving means to prevent operation of the machine when the retaining means is out of coacting relationship with the shoulder; and manually operable means to release the holding means to permit the retaining means to return into coacting relationship with the shoulder and to enforce operation of said manually operable means.

7. In a machine of the class described, constructed and arranged to perform operations in which labels are printed and issued, said machine having means to initiate such operations, the combination of a removable printing element to print certain data on the label; a receptacle for the element; a shoulder on the element; means including a finger coacting with the shoulder when the element is properly inserted in the receptacle to secure said element in said receptacle; manually operable means to move the finger out of coacting relationship with the shoulder to permit removal and insertion of the element; yieldable means normally effective to restore the finger into coacting relationship with the shoulder; means to hold the finger in ineffective position against the action of the yieldable means; means operatively connected to the manually operable means and coacting with the initiating means to prevent operation of the machine when the finger is in ineffective position; and a second manually operable means to release the holding means to permit the yieldable means to restore the finger and the preventing means to effective and ineffective positions respectively to secure the element in the receptacle and to free the initiating means for operation.

References Cited in the file of this patent

UNITED STATES PATENTS

| | | |
|---|---|---|
| 1,091,498 | Friedlein | Mar. 31, 1914 |
| 1,254,825 | Martin | Jan. 29, 1918 |
| 1,309,954 | Martin | July 15, 1919 |
| 1,539,382 | Thompson | May 26, 1925 |
| 1,761,684 | Robertson | June 3, 1930 |
| 1,823,262 | Errera | Sept. 15, 1931 |
| 1,858,813 | Wheelbarger | May 17, 1932 |
| 1,916,845 | Leland | July 4, 1933 |
| 1,968,166 | Phythian | July 31, 1934 |
| 2,276,111 | Spears | Mar. 10, 1942 |
| 2,647,457 | Spargo | Aug. 4, 1953 |